INVENTORS.
Patrick L. Hunter,
William H. Bixby,
Brown Jackson Boettcher & Dienner
By
Attys.

United States Patent Office 3,514,687
Patented May 26, 1970

3,514,687
EMERGENCY END CELL BATTERY CHARGER
Patrick L. Hunter, Worthington, and William H. Bixby, Columbus, Ohio, assignors, by mesne assignments, to North Electric Company, Galion, Ohio, a corporation of Ohio
Filed Dec. 8, 1966, Ser. No. 600,161
Int. Cl. H02j 7/04, 9/06
U.S. Cl. 320—15           10 Claims

ABSTRACT OF THE DISCLOSURE

Automatic battery charger for charging emergency end cells associated with a main battery, such as used for example in a telephone central office. If the alternating current source which charges the main battery fails, and the voltage of the main battery decreases to a given value, emergency end cells are automatically switched in series with the main battery to provide additional voltage. When the alternating current source is reestablished, a first automatic charging means charges the main battery and at least one separate end cell charger is automatically enabled to charge the end cells.

BACKGROUND OF THE INVENTION

Field of the invention

The present invention relates to rectifying systems for battery charging. See Classes 320 and 321.

Description of prior art

In conventional offices of a telephone system, it is conventional to provide a main battery as the power source for the office, and battery charger means comprising rectifying means powered by an alternating current source to float-charge the main battery and supply the direct current load during the presence of alternating current.

It is also conventional to provide emergency end cells with means for automatically switching the end cells in series with the main battery to increase the voltage if, due to failure of the AC source, the main battery voltage falls to a preset value. This arrangement is capable of maintaining the DC output voltage at the office within tolerable limits for power failures of long duration.

Switch means associated with the battery charger means are manually manipulated so that upon return of the AC source, the battery charger means will charge the main battery and end cells with the main battery and load in parallel with each other, and this parallel combination in series with the end cells. Thus the battery charger means must have sufficient capacity to supply the power to recharge both the main battery in parallel with the load, and additionally, to charge the end cells. For example, with a 23-cell main battery the charger must supply full load to recharge 25 or 27 cells including the emergency end cells. In offices which have a plurality of main batteries, each main battery charger must have this added capacity. Such requirement increases the size, weight, cost, and complexity of the main battery charger means, which, as noted, becomes particularly significant when the office has more than one main charger.

Further, the end cells are recharged by passing a portion of the load current through the end cells so that the rate at which these end cells are charged depends upon the magnitude of the load. The voltage across the end cells must be monitored by attendent personnel to insure that an overcharge resulting in excessive gassing does not occur, and requires that the battery charger means be manually switched back to the main battery after the end cells are fully charged.

SUMMARY OF INVENTION

The present invention provides separate emergency end cell charger means for use in such systems which are fully automatic in operation and which eliminate the need for main battery charger means which incorporate the excess capacity required in the recharging of both the main battery and the emergency end cells.

In one environment in which the end cell charger of the invention operates, means are provided for disconnecting the end cell charger means from the AC source terminals when the AC source fails, holding the end cell charger means disconnected when the AC source reappears until the main battery is charged, and thereupon reconnecting the end cell charger means to the AC source to recharge the end cells. The end cell charger of the invention may be operated also in an environment in which the connection to the AC source is not switched when the source fails.

The recharging of the end cells is automatically controlled by end cell charger means in a procedure which involves current walk-in up to a preset current limit $I_m$, after which the current, under control of the current limit setting of the charger, remains constant. The period of operation in the constant current mode may be as long as eight hours for fully discharged end cells. During the current walk-in, when the current attains a preset value, voltage overcharge means are automatically switched on, and the voltage increases to a preset overcharge plateau of 2.3 volts per cell, which is maintained constant by the voltage regulation means of the end cell charger means. When the plates in the battery have accepted current required to change their chemical composition from lead sulphate to lead and lead dioxide, polarization sets in and builds up a back voltage, causing the charging current to start dropping.

When the charging current reaches a preset minimum value, the end cell charger automatically lowers its regulating voltage from the overcharge voltage, such as 2.3 volts per cell, to a normal float charge voltage of 2.17 volts per cell, resulting in the charging current decreasing to zero until the end cells attain the voltage of 2.17 volts per cell. Thereupon the charger provides current at a so-called "trickle rate" which is sufficient to overcome the internal losses of the battery. The voltage from then on remains at its float voltage of 2.17 volts per cell. The end cells are thus quickly recharged in preparation for the next outage.

It is an object of the present invention therefore to provide a fully automatic charging system for emergency end cells for use in automatic telephone systems, and particularly to provide a charger of such type which includes a first means for providing closely regulated voltage at a first level to float-charge the end cells at a relatively low current rate (yet sufficient to supply the internal losses of the battery and maintain the desired voltage), and means which provide a constant current charge at a relatively high current rate to recharge the end cells in a minimum time.

It is a further object of the invention to provide voltage regulator means for providing regulation in a float voltage mode and an overcharge voltage mode, and current sensor means for selecting the mode of operation.

It is an additional object of the invention to provide a charger of such type which includes a walk-in circuit which provides a gradual current increase in change of the charger from the float charge mode to the overcharge voltage mode, and further means for limiting the maximum current flow during the overcharge mode.

It is an additional object of the invention to provide a novel battery charger of such type which includes circuit means operative in parallel with other chargers of a similar type.

BRIEF DESCRIPTION OF THE DRAWINGS

The above and other objects, advantages and features of the invention will be apparent to those skilled in the art from the following detailed description, taken in conjunction with the accompanying drawings, in which.

DESCRIPTION OF THE PREFERRED EMBODIMENT

Figure 1A:
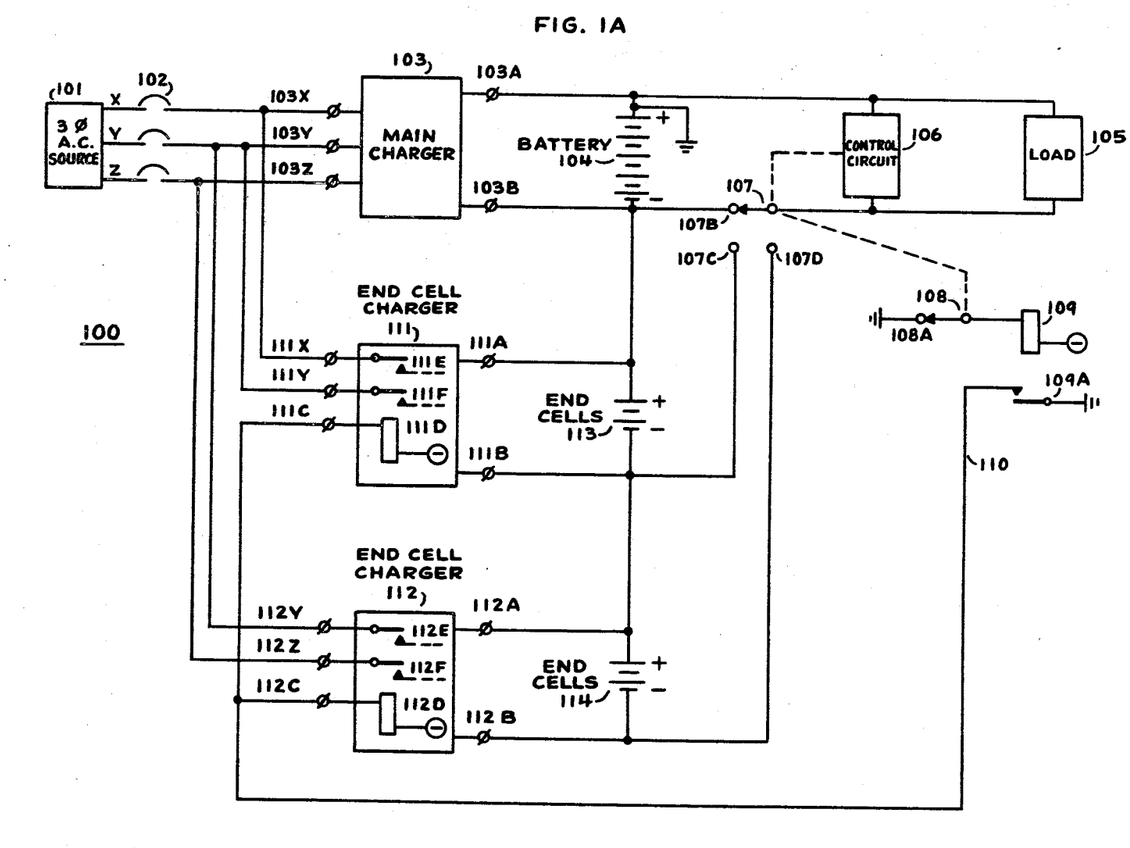
FIG. 1A is a block diagram of an illustrative system involving main charger and end cell charger means.

Environmental system description (FIG. 1A)

In the upper left of FIG. 1A, a three phase AC source 101 with phases X, Y, and Z is connected by circuit breaker 102, when closed, via terminals 103X, 103Y, and 103Z to a main charger 103, one embodiment of which is disclosed in the copending patent applications having Ser. No. 311,053, filed Sept. 24, 1963, by William H. Bixby, and assigned to the assignee of the present invention, and having Ser. No. 409,855, which was filed Nov. 9, 1964, by Patrick L. Hunter, and assigned to the assignee of the present invention.

Charger 103 provides a voltage regulated output via terminals 103A and 103B to the main battery 104, which may for example have twenty-three cells, and to a load 105 which is connected across the positive and negative terminal of the battery 104 with the positive terminal being grounded.

Control circuit means 106 connected in parallel with load 105 senses the voltage across the load and controls a switch 107 and associated contacts 107B which is connected between the negative terminal of the battery 104 and the load 105. Switch 107 is also mechanically linked to switch 108 which has a contact set 108B which is closed when contacts 107B are closed, and which are open when contacts 107B are open.

End cells 113 which may comprise two cells, and end cells 114 which may also comprise two cells are connected in series with the main battery 104 as shown. End cell chargers 111, 112 are connected to source 101 to provide a charging source for end cells 113, 114, respectively.

That is, phase XY of source 101 is connected to input terminals 111X and 111Y of the first end cell charger 111, and output terminals 111A and 111B of charger 111 are connected across end cells 113 as shown. Terminal 111B is also connected to contacts 107C of switch 107 as shown.

Phase YZ is connetced to input terminals 112Y and 112Z of the second end cell charger 112. Output terminals 112A and 112B of charger 112 are connected across end cells 114 as shown. Terminal 112B is also connected to contacts 107D of switch 107 as shown.

End cell chargers 111 and 112 include a pair of contactors which are connected over input terminals 111C and 112C to make contacts 109A of control relay 109. Control relay 109 is energized through contacts 108B of switch 108 which is controlled by switch 107.

Normally, with the AC source providing power, charger 103 is trickle charging battery 104 which supplies the load over terminals 103A, 103B and closed contacts 107B.

Control circuit 106 senses the load voltage and during the normal range of load voltages, arm 107A of switch 107 engages contacts 107B to maintain arm 108A of switch 108 in engagement with contact 108B. Relay 109 is thus normally operated over an obvious circuit from battery 104, and at its contacts 109A completes energizing circuits to contactor relays 111D and 112D in end cell chargers 111, 112. With contactor relays 111D and 112D operated, contacts 111E, 111F, 112E, and 112F are closed to connect phases XY and YZ of source 101 to end cell chargers 111 and 112 respectively, which responsively provide trickle charges to end cells 113 and 114, respectively.

If the voltage across the load decreases to a predetermined value set in control circuit 106, as for example with failure of the AC power source 101, control circuit means 106 operate switch 107 to transfer its arm 107A from contacts 107B to contacts 107C, placing the battery 104 and end cells 113 in series across the parallel combination of control circuit 106 and load 105 to raise the voltage across the load.

When switch 107 transfers its arm 107A from contacts 107B to 107C it also causes switch 108 to transfer its arm 108A away from contacts 108B, releasing relay 109 which opens its contacts 109A to release contactor relays 111D and 112D. Contactor relay 11D opens contacts 111E and 111F, and contactor relay 112D opens its contacts 112E and 112F to disconnect end cell chargers 113, 114 from the AC source terminals. If after a period of time, the voltage of the series combination of batteries 104 and 113 drops to a further value preset in control circuit 106, the control circuit 106 causes switch 107 to transfer its arm 107A from contacts 107C to contacts 107D, placing the battery 104 and end cells 113, 114 in series across the parallel combination of control circuit 106 and load 105, to once more raise the voltage across the load. (When the arm 107A of switch 107 is in positions 107C and 107D, contacts 108B remain open.)

When the AC potential is restored by source 101, charger 103 charges main battery 104 and supplies current to the load 105. When the voltage across the combination 104 of battery and end cells 113, and 114 reaches a value preset in control circuit 106, the control circuit 106 causes switch 107 to transfer its arm 107A from contacts 107D to contacts 107C. When the voltage across the combination 104 and 113 subsequently reaches a value preset in control circuit 106, switch 107 is operated to transfer its arm 107A from contacts 107C to 107B. When switch 107A transfers its arm to position 107B, switch 108 is caused to transfer its arm 108A to contacts 108B, operating relay 109 which closes its contacts 109A to energize contactor relays 111D and 112D. Relay 111D closes its contacts 111E and 111F and relay 112D closes its contacts 112E and 112F whereupon end cell chargers 111 and 112 quickly charge their end cells 113 and 114. As the charge is completed, the chargers 111, 112 maintain a trickle charge on the end cells 113 and 114.

Figure 1B:
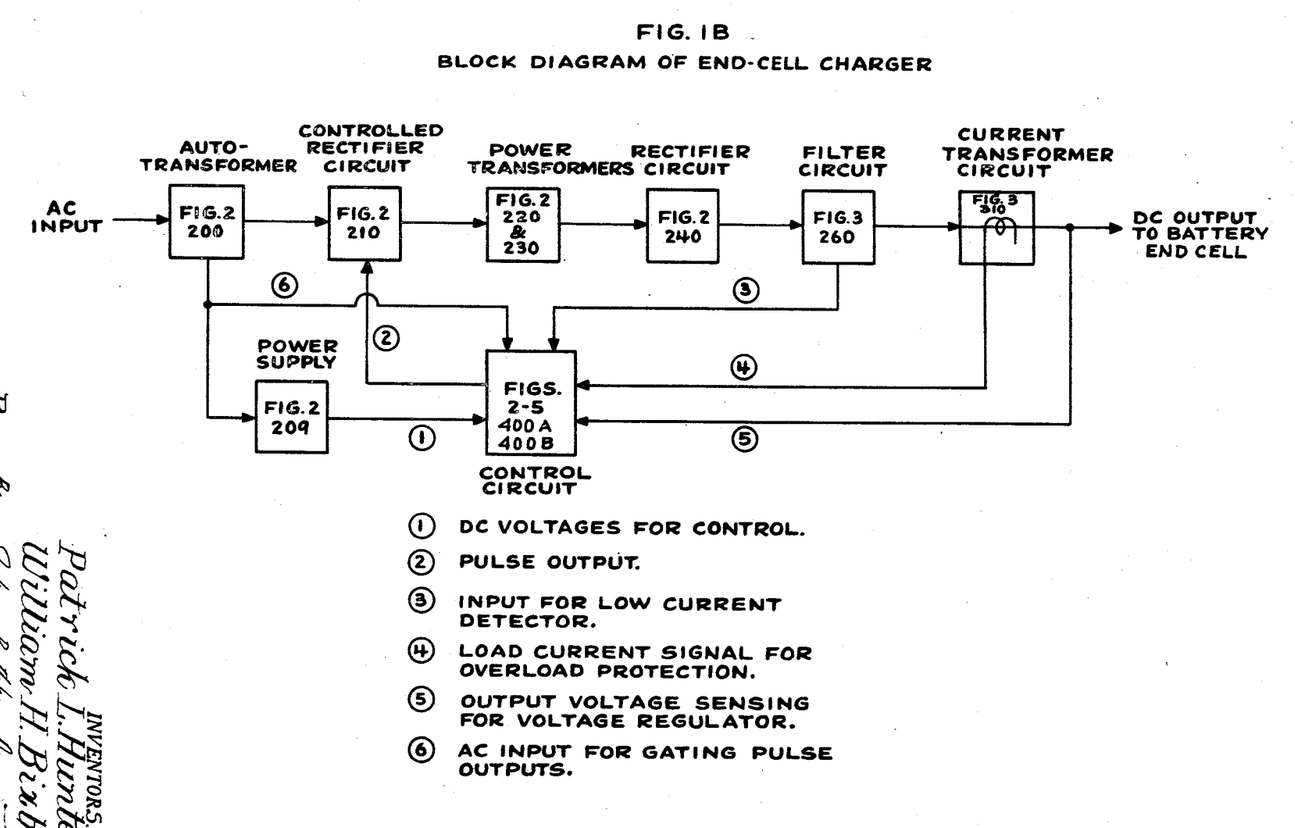
FIG. 1B is a block diagram of the novel end cell charger means of the invention.

BLOCK DIAGRAM DESCRIPTION OF THE END CELL CHARGER (FIG. 1B)

A single line block diagram of an end cell charger, such as chargers 111 and 112, is shown in FIG. 1B. At the left side thereof AC input is connected to a box representing an auto-transformer 200. Inside the box will be found the designation 200 (FIG. 2) which means that in the detailed schematics of FIGS. 2–5, the auto-transformer will be found in FIG. 2 and identified by the number 200. The further boxes of the figure are identified in like manner.

The auto-transformer 200 permits matching of the battery charger input terminals to the norminal line voltage which is available. The output of the auto-transformer 200 supplies power for a power controlling means consisting of a controlled rectifier circuit 210 which may employ silicon controlled rectifiers to in turn supply a controlled voltage to the primary of the power transformer 220, 230. The output of the power transformer 230 is rectified by rectifier circuit 240 and filtered by filter circuit 260 to supply the DC output voltage for the battery load.

Control circuits 400A, 400B provide phase shifted gate pulses over path (2) to control the firing of the silicon controlled rectifiers 210 to vary the input to the power transformer 220, 230 in response to signals derived from the DC output voltage and current. As will be shown such control is effected by circuits 400A, 400B over path (2) to correct for output voltage error while in a voltage regulating mode, and to correct for output current error while in a current regulating mode of operation.

Control circuits 400A and 400B further include an input ① connected to power supply 209 to provide DC bias voltages for the semiconductor control circuits; an input ⑤ connected to the load to sense the voltage for voltage regulation purposes; an input ④ connected to the load to sense current for current regulation purposes; an input ③ for providing signals proportional to load current at extremely small current values for alarm purposes; and an input ⑥ which supplies AC voltage to synchronize and reset the timing circuits in the pulse generators in the control circuits 400A, 400B.

MODE OF OPERATION

The mode of operation of an end cell charger, such as 111, 112, is best explained by reference to the curve and data set forth in FIG. 1C. In curve $a$ the output voltage is depicted as a function of time, and in curve $b$ the output current is shown as a function of time. Normally, the charger float-charges the battery at a very low rate just enough to supply the internal losses of the battery and to maintain its voltage at 2.17 volts per cell. Thus the current is normally quite small, as shown by the time interval before $t$ in curve $b$. Assuming that the AC power source fails at time $t1$, the main charger and the end cell chargers cease to supply current between times $t1$ and $t2$ and the voltage of the main battery (not shown in the curve) decreases. It is further assumed that at time $t2$, the end cells 113, 114 are switched in series with the main battery 104 so that the load discharges the end cells between times $t2$ and $t4$, the minimum voltage reached being determined by the duration of the power failure and the load. If AC power is restored at time $t3$, the main battery charger 103 (FIG. 1A) takes over and the end cells are disconnected from the load at time $t4$. Additionally, switch 109 operates to turn on the end cell chargers 111, 112 at time $t4$ to recharge the end cells 113, 114. The end cell charger picks up current gradually during the "walk-in" period between $t4$ and $t5$ and the battery voltage which is low gradually rises. As the current rises above the preset value $I_1$ (between $t4$ and $t5$ as shown in curve $b$) the regulator is automatically switched electronically into a high voltage charge state (for example, 2.3 volts per cell).

At $t5$, as the current rises to value $I_m$, the charger is current limited and the circuit regulates constant current until the voltage rises to the high charge voltage at time $t6$. As the high charge voltage is reached and held at 2.3 volts per cell in the present example, the current decreases until it drops below a preset minimum current $I_2$ at $t7$, and the charger is electronically switched back to the normal float-mode of operation. During the time $t7$ to $t8$, the current drops to zero and remains at zero until the battery voltage drops from the overcharge value of 2.3 volts to 2.17 volts per cell ($t8$) whereupon the voltage regulator supplies the trickle charge for time periods $t8$ and beyond.

By charging at a higher voltage setting (i.e., 2.3 volts per cell), the chargers 111, 112 restore the end cell batteries 113, 114 to full charge in a much shorter period of time than if charged at a lower setting of 2.17 volts per cell. As will be shown, the cycle described above is completely automatic and requires no manual operation. However, provision is also made to manually overcharge the end cell by means of a manual switch on the charger if so desired.

CIRCUIT DESCRIPTION

Figure 2:
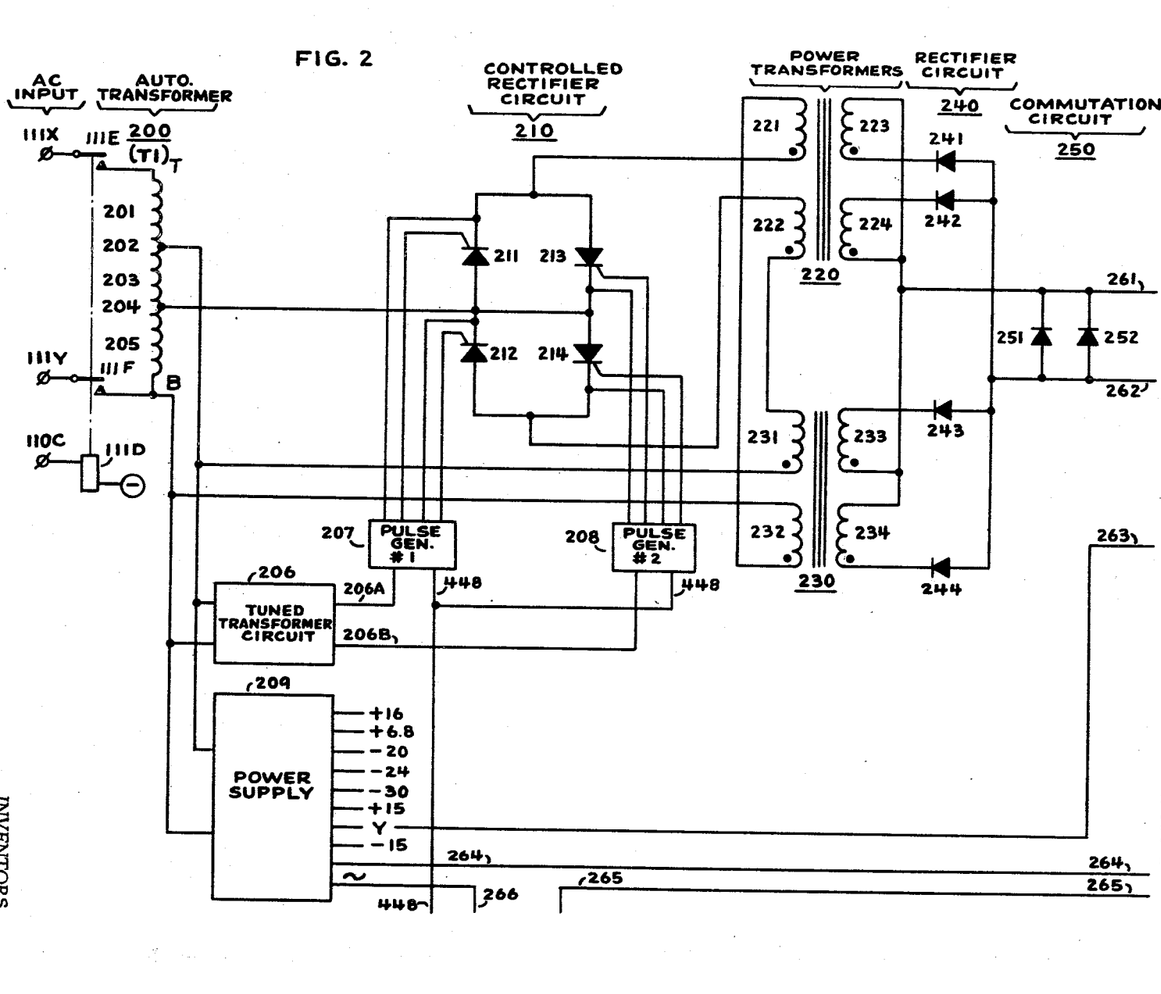
FIGS. 2–5, when assembled, illustrate in more detail the end cell charger means of the invention, the power portion of the end cell charger means with low current detector and indicator means being illustrated in FIGS. 2 and 3, the control portion of the end cell charger means with the current switching and regulator circuit being shown in the upper portion of FIGS. 4 and 5, and the voltage feedback regulator circuit being shown in the lower portion of FIGS. 4 and 5.
Figure 3:
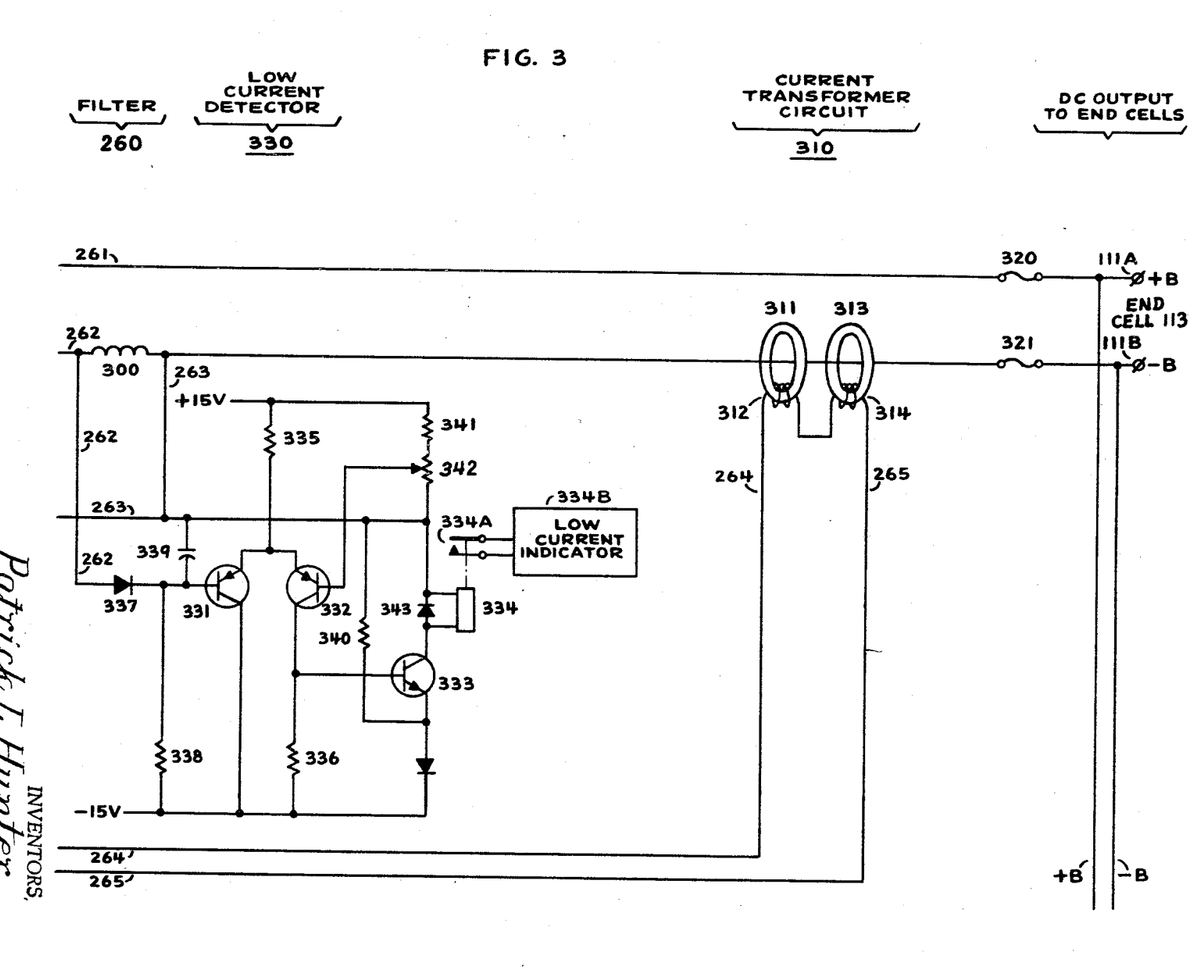
Figure 4:
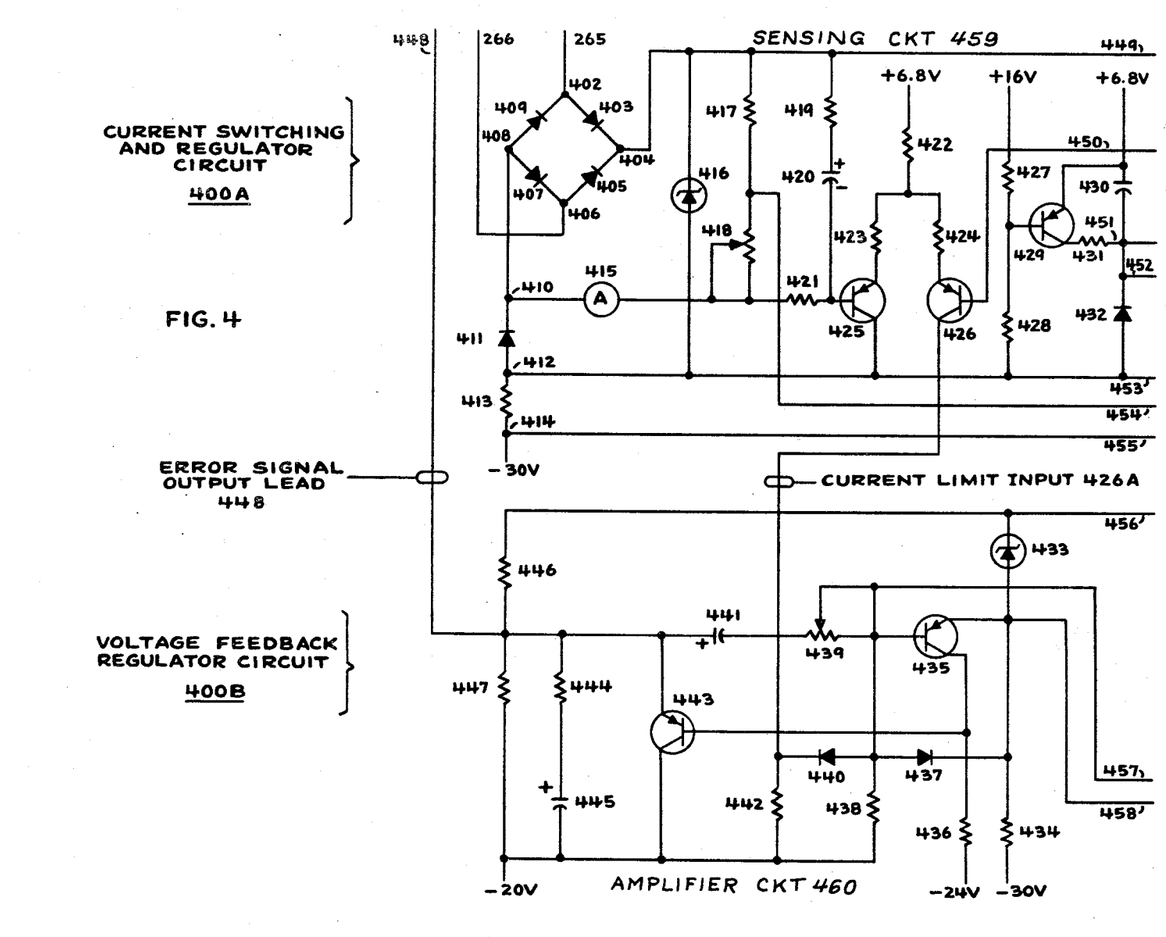
Figures 5, 6:
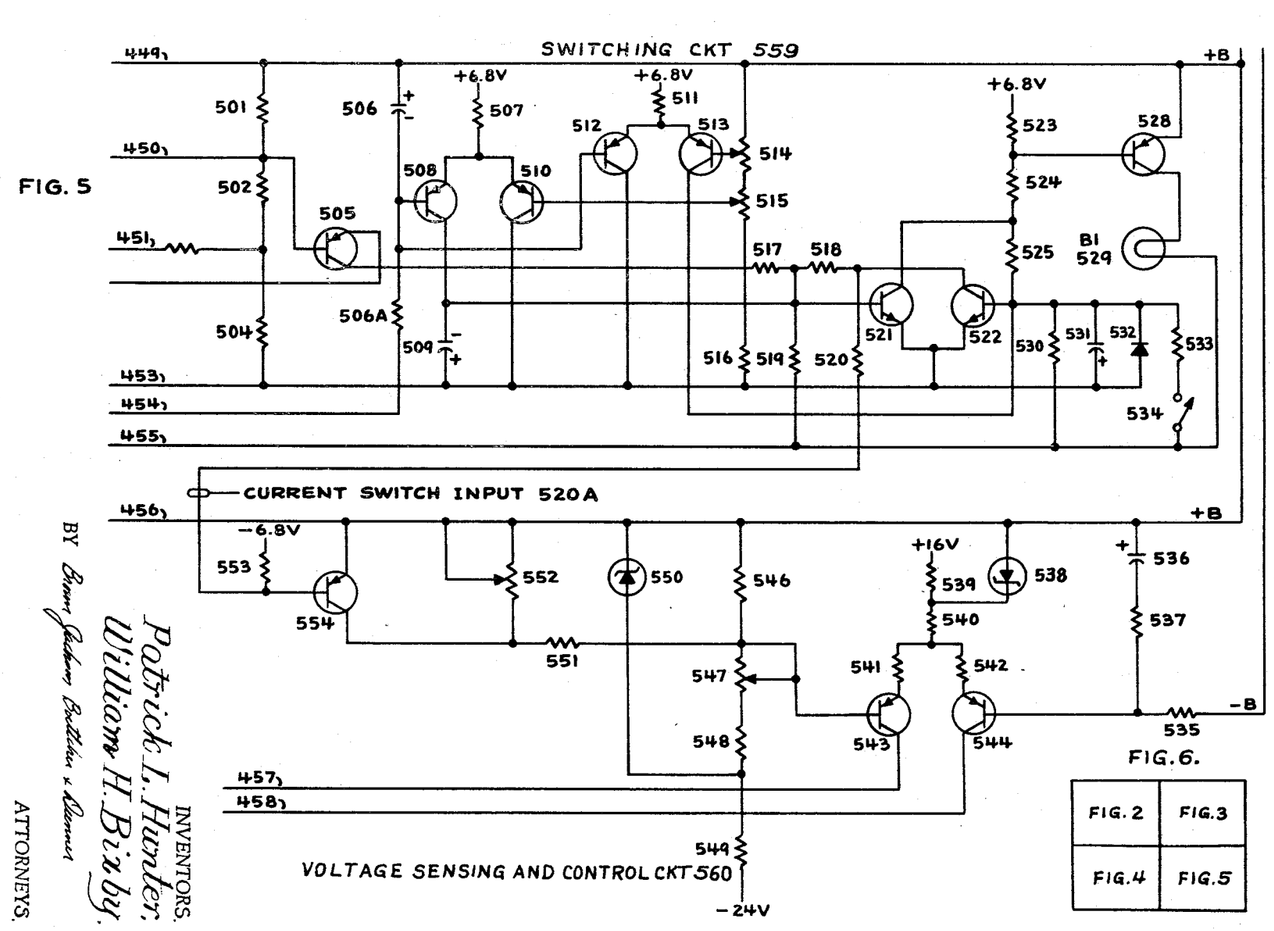
FIG. 6 sets forth the pattern of assembly of FIGS. 2–5.

A detailed showing of end cell chargers, such as 111, 112, is set forth in FIGS. 2–5, and as there shown, the end cell charge comprises a power portion (FIGS. 2, 3) and a control circuit for the power portion (FIGS. 4 and 5). As shown in FIGS. 2 and 3 the power section of the emergency cell charger consists of (1) an auto-transformer 200 which is adjustable to maintain the output voltage of auto-transformer 200 for different nominal input voltages; (2) a silicon controlled rectifier section 210 which provides phase control regulation for (3) a power transformer section comprising transformers 220 and 230; and (4) a rectifier circuit 240 and filter section 260 which rectifies and filters the output of the power transformer section to generate a smooth output voltage for an end cell, such as 113.

The input connections 111X, 111Y shown on the auto-transformer 200 are for a high voltage AC input. In order to maintain a lower operating voltage across the SCR's, a center-tap 204 on transformer 200 divides the voltage which appears across terminals 202 and the bottom tap B so that the voltage across each half of the winding portion 203, 205 is applied to a back-to-back pair of silicon controlled rectifiers 211, 212 and 213, 214. The SCR's 211–214 are phase controlled by pulse control circuitry in a mode as will be shown of the type described in detail in Silicon Controlled Rectifier Manual, second edition, published by General Electric Company, Auburn, N.Y.

At the beginning of each half cycle of the AC input over conductors 111X, 111Y, the SCR's are in a non-conducting state, and the voltage applied to power transformers 220 and 230 is zero. In a given half cycle after the AC source voltage goes through zero and a delay angle $\alpha$, SCR's 211 and 212 are pulsed to a conducting state by simultaneous gate signals from pulse generator circuit 207. Assuming that the top end of transformer winding T is positive with respect to the bottom end B, one circuit can be traced from terminal 202, winding 231 of transformer 230, winding 222 of transformer 220, SCR 212 to center tap 204. Another circuit can be traced from center tap 204, SCR 211, winding 221 of transformer 220, winding 232 of transformer 230 to terminal 111Y. The primary winding 232 and 231 of transformers 220 and 230 are connected in series (as are the further primary windings 221, 232 on the same transformers) when SCR's 211, 212 conduct, and the current flow is in the same direction in each of these primary windings during this half cycle. The output terminals of secondary windings 224, 233 associated with primary windings 222, 231, of transformers 220, 230 are connected in parallel (i.e., poled) so that when SCR's 211 and 212 conduct during one half cycle the polarity of the current in the secondary windings 224, 233 causes the output rectifiers 242 and 243 to conduct whereby half the load current for each half cycle flows through rectifier 242 and the other half flows through rectifier 243.

After a delay angle $\alpha$ in alternate half cycles, SCR's 213 and 214 are pulsed to a conducting state by gate signals from pulse generator circuit 208. With the bottom terminal B of transformer 200 positive with respect to the top terminal T thereof, one circuit can be traced from terminal B, winding 232, winding 221 and SCR 213 to center terminal 204. Another circuit can be traced from center terminal 204, SCR 214, winding 222, winding 231, to terminal 202. During the half cycle in which SCR's 213, 214 conduct, the current flow in the primary windings 221, 222, 231, 232 reverses and the connections of secondary windings 224, 233 control the rectifiers 241, 244 to share conduction of the load current. Rectifiers 251 and 252 are commutating rectifiers which conduct current in the path including the load when the polarity of the input voltage reverses to turn off the SCR's in the rectifier circuit 210.

By controlling the angle α, the area under the curve representing the voltage applied to the transformers 220 and 230 and also the area under the curve representing the voltage applied to the load circuit are controlled, i.e., held constant. The DC output voltage from the charger is proportional to this area and can be controlled by a feedback amplifier to maintain the output voltage constant for changes in the load current and AC line voltage. Choke coil 300 filters the output voltage of the rectifier section and produces a smooth DC voltage at the output terminals 111A and 111B which are connected to the end cells. Fuses 320 and 321 provide fuse protection for overload. Since the output terminals are always at a different potential than ground potential, a fuse in each output lead is required to protect against a fault produced by shorting either terminal to ground. Elements 311 and 313 comprise DC current transformer means which provide a control current in coils 312 and 314 proportional to the load current. This control current is adjusted to limit the output current at full load and to provide constant current regulation when the battery voltage is low (see interval t5–t6, curve b). This control also limits the current at the output terminals at full load when the charger is operated in parallel with another charger.

CONTROL FOR RECTIFIER CIRCUIT 210

Pulse generator circuits 207 and 208 are provided to pulse SCR's 211, 212 and SCR's 213, 214 on alternate half cycles as will be understood by one skilled in the art. A tuned transformer circuit 206 connected to terminals 202 and 111Y provides signals to pulse generator circuits 207 and 208 via leads 206A and 206B, which signals are 180 degrees out of phase and provide synchronization of the pulse generator circuits. The pulses to the SCR's are delayed by the angle α which is in turn determined by the magnitude of the composite error signal on the output conductor 448 of the voltage feedback amplifier circuit 460. The composite error signal is varied to adjust the angle α to the value necessary to maintain the DC output voltage constant. The lower portion of FIGS. 4 and 5 comprises a circuit diagram of a current switch and regulator circuit 400A and a voltage feedback regulator circuit 400B. The regulator circuit 400B basically includes an amplifier circuit 460 and a voltage sensing and control circuit 560 which senses deviations in the DC load voltage at output terminals 111A and 111B (FIG. 3) and produces an error signal over amplifier circuit 460 and output conductor 448 (FIG. 4) to the pulse generator circuits 207 and 208 (FIG. 2) to adjust the load voltage to the desired value. Additionally the value of the error signal provided over conductor 448 is determined by signals provided by current switching and regulator circuit 400A (a) over input 426A to amplifier 460 to limit maximum current in the constant current mode, and (b) over input 520A to adjust the control circuit 560 between the overcharge and float charge modes.

DESCRIPTION OF THE CONTROL CIRCUIT

More specifically, in the lower right portion of FIG. 5, a voltage sensing and control circuit 560 is shown to include resistors 535, 537 and condenser 536 which filter the input voltage which is derived across the end cell connected to terminals 111A, 111B. A differential amplifier including transistors 543 and 544 and resistors 540, 541, 542, is connected to the output of the filter circuit 535, 536, 537 to compare the end cell voltage with a reference voltage and to produce an error signal which indicates the difference, transistor 544 being connected for control by the filtered end cell voltage and transistor 543 being connected for control by the reference voltage. Resistor 539 and Zener diode 538 are connected to provide a stable operating voltage for the differential amplifiers.

The adjustable reference voltage for the differential amplifier is provided over resistors 546, 547, 548, 549 and Zener diode 550. Adjustment of resistor 547 to different positions varies the output voltage provided by the charger to different values. Additionally, as will be shown, the reference level for the differential amplifier 541, 542 is further controlled by level selection transistor 554 and resistors 553, 552, 551 which are connected between the current switch input conductor 520A and the voltage divider 546–548. Changes are provided in the reference signal by such circuit to adjust the voltage regulation of the charger between "float charge" and "overcharge" modes.

AMPLIFIER CIRCUIT 460

The output of the differential amplifier 541, 542 is fed over conductors 457, 458 to transistors 435, 443 which amplify such output to produce an error signal output over lead 448 to the pulse generator circuits 207 and 208. Resistor 439 and capacitor 441 are provided to control the feedback stability of the total regulator system. Zener diode 433 and resistor 434 provide a stable operating voltage for the amplifier circuit 460. Diode 437 comprises a protective circuit which limits the reverse base to emitter voltage applied to transistor 435. Diode 440 and resistor 442 comprise a signal coupling network which, as will be shown, couples the signal output of the current regulator circuit 400A to the amplifier circuit 460 in its variation of the error signal output of the voltage control circuit 560. Resistor 444 and capacitor 445 filter the error signal output from the amplifier circuit and prevent high frequency noise from appearing at the input to the pulse generators. Resistors 446 and 447 make up a divider network which limits the maximum voltage deviation at the error output.

CURRENT SWITCHING AND REGULATING CIRCUIT 400A

The current switching and regulating circuit 400A shown in the upper portions of FIGS. 4 and 5 basically comprises a current limiter section, a section for automatically switching the charger between float and overcharge modes of operation, and controlling the current outputs in such modes, and a walk-in section for controlling the current during a shift between modes. As noted above, the current regulator circuit 400A provides a current path over conductor 426A to the base of transistor 435 in the amplifier 460 whenever the load current reaches a preset maximum value determined by the current sensing circuit 459. When the load current reaches this preset maximum value, diode 440 in the amplifier 460 conducts and lowers the base potential of transistor 435 which results in raising the potential of the error signal output. This produces a larger delay angle α which lowers the DC output voltage to reduce the load current.

The switching circuit 559 for controlling switching between the overcharge and float charge modes is connected over conductor 520A and resistors 551, 552, 553 and transistor 554 in voltage sensing and control circuit 560. Transistor 554 is operated in a switching mode by signals input over conductor 520A and automatically changes the reference voltage applied to the base terminal of transistor 543 in response to the signals applied to the base of transistor 554. In normal operation while float charging the battery at 2.17 volts per cell, transistor 554 is saturated and resistor 551 is connected in parallel with resistor 546 through the low impedance collector-emitter path of transistor 554 to provide a more positive reference signal and control at the float charge level. During the overcharge mode of operation, transistor 554 is in a nonconducting state and the parallel path is interrupted whereby a more negative reference signal is provided to operate the charger at the higher overcharge level.

By adjusting the slider of resistor 552 upward, the total resistance in parallel with resistor 546 is increased resulting in the reference voltage going more negative with respect to potential +B which increases the magnitude of the output voltage. Adjustment downward has the reverse effect. It is apparent therefore that the resistor 552 provides a means of adjusting the level at which overcharge occurs. The specific connections of these several circuits is now set forth in more detail.

SENSING CIRCUIT 459

The current switching and regulating circuit 400A is fed by current provided by a DC current transformer 311–314 which is energized by an AC output over leads 264 and 265 from the power supply 209, and is controlled by load current flow to terminals 111A, 111B. The manner of operation of this DC current transformer is well understood by those skilled in the art.

Current proportional to the load current as supplied by the DC current transformer windings 311 and 313 is rectified by bridge rectifier 401. Resistors 417, 418 and ammeter 415 are connected across the output terminals 404, 408 of rectifier 401 so that the voltage across resistors 417 and 418 is therefore proportional to the load current. This voltage is filtered by a network comprised of resistors 421, 419 and capacitor 420 and is applied to the base of transistor 425, which has an emitter connected common with the emitter of transistor 426 in a differential amplifier configuration. Resistors 422, 423, and 424 are bias resistors for the differential amplifier.

The base potential to transistor 426 is a stable reference voltage which is produced by a voltage divider comprising resistors 501, 502 and 504 connected across Zener diode 416. If the base potential of transistor 425 becomes more negative than the base potential of transistor 426, the differential amplifier supplies a current limit signal at the collector of transistor 426 and over lead 426A to the voltage feedback amplifier. As the current limit signal reaches a pre-determined value, diode 440 conducts and amplifier 460 controls the output voltage of the charger to drop to hold the load current constant. This circuit therefore provides constant current regulation and limits the maximum charging current to the battery.

The value of the current provided over path 426A in the current regulation mode can be adjusted by variable resistor 418. The ammeter 415 is calibrated to read the load current of the charger, whereby the need for a current shunt in series with the DC output terminals of the charger is eliminated. Diode 411 clamps the voltage across resistors 417 and 418 at a value equal to the Zener voltage of Zener diode 416 to prevent the introduction of larger transient voltages into the regulating circuit.

SWITCHING CIRCUIT 559

Switching circuit 559 includes a bistable circuit and basically comprises a pair of transistors 521 and 522 for controlling on-off switching of transistor 554 in the voltage sensing and control circuit 560 (FIG. 5). The operation of the bistable circuit 521, 522 is in turn determined by a first differential amplifier 508, 510 which effects a change of state of circuit 521, 522 at a predetermined maximum current level and a second differential amplifier 512, 513 which effects a change of state of circuits 521, 522 at a predetermined minimum current level.

More specifically, during float charge, transistor 522 is saturated and transistor 521 is cut off. Base current to operate transistor 554 to saturation is supplied through resistor 520 and collector-emitter path of transistor 522. The bistable circuit 521, 522 remains in this state because of the positive feedback current path through resistors 518 and 525. Resistors 519 and 530 provide paths for collector-base leakage current when its associated transistor 521 or 522 respectively is in the cut off state.

Shifting of the bistable circuit between the stable states is effected by inputs at the base of transistor 521 and 522. The base of transistor 521 is controlled by the differential amplifier consisting of transistors 508 and 510. The base of transistor 508 is in turn connected over resistor 506A and conductor 454 to the voltage divider 417, 418 in the sensor circuit 459. The base of transistor 522 is controlled by the differential amplifier comprised of transistors 512, 513, the base of transistor 512 being connected to the sensor circuit 459 over conductor 454 with transistor 508.

The voltage which is derived across resistor 417 and fed over conductor 454 thus provides the signal which ultimately controls the switching functions of the differential amplifier 521, 522. Capacitor 506 and resistor 506A filter the voltage across resistor 417 to lower the ripple voltage content, and the voltage across capacitor 506 is applied to the base electrodes of transistor 508 and 512. An adjustable reference level for both differential amplifiers 508, 510; 512, 513 is provided by the divider network comprising potentiometers 514 and 515 and resistor 516 connected across the stable Zener reference 416. Such level is derived from potentiometer 515 for transistor 510 in the first differential amplifier to adjust the maximum current setting, and a second level is derived from potentiometer 514 for transistor 513 in the second differential amplifier to adjust the minimum current setting.

If the load current of the charger increases above a maximum preset value as determined by the setting on adjustable potentiometer 515, the signal over conductor 454 controls transistor 508 to conduct and supply forward bias current for transistor 521. Transistor 521 switches to a conducting state and transistor 522 turns off. When transistor 522 turns off, the drive is removed from the base of transistor 554 which turns off to switch the charger into the overcharge mode of operation wherein regulations is provided at a higher voltage.

The charger remains in this overcharge state until the current drops below a minimum value determined by the switching level of a further differential amplifier consisting of transistors 512 and 513 and the setting on adjustable potentiometer 514. When the current drops below this minimum current setting, transistor 513 switches into a conductive state applying forward base drive to transistor 522 which switches the bistable circuit back into the float charge state.

As noted above, the minimum current setting determined by differential amplifier 512, 513 may be adjusted by potentiometer 514 and the maximum current level determined by differential amplifier 508, 510 may be adjusted by potentiometer 515. An example of the current adjust range for these two adjustments is zero to thirty percent for the minimum setting and thirty to one-hundred percent for the maximum current setting.

Transistor 528 and indicator 529 provide a monitoring circuit which gives a visual indication of an overcharge mode of operation. Transistor 528 is connected over dividers 523, 524, 525 to the output of transistor 521 and conducts when transistor 521 is switched to a conductive state. Conduction of transistor 528 energizes indicator lamp 529 to provide the desired visual indication.

WALKIN CIRCUIT

The novel charger further includes a walk-in circuit when which forces the charger to pick up the load gradually when starting the charging of the end cells. Such circuit basically comprises transistors 429, 505 and capacitor 430, resistors 501, 502, 504 and diode 432. When the charger is off, capacitor 430 is discharged as will be shown. When the charger is turned on, the emitter of transistor 505 connected to the capacitor 430 is raised to a potential more positive than +B, and current flows through capacitor 430, the emitter to base of transistor 505 and into the connection between resistors 501 and 502. The potential at this connection point is made positive than +B, and the differential amplifier, comprising transistors 425 and 426 is operated to supply a signal at the current limit output lead 426A which limits the output current to zero.

As capacitor 430 charges up, the potential of the base of transistor 426 drops below +B and the charger starts to regulate in a current mode. With the changing value of voltage reference across resistor 501 resulting from the charging of capacitor 430, the signal over conductor 426A effects a slow change in the error signal provided over conductor 448 and therefore a slow increase in the current flow to the load. Such increase continues until the current reaches the setting as determined by adjustable potentiometer 418.

During the walk-in interval, transistor 505 operates the switching pairs 521, 522, to force the charger into the overcharge mode, the collector current of transistor 505 flowing through resistor 517 into the base electrode of transistor 521 to effect such switching. At the end of the walk-in interval, the emitter of transisor 505 becomes more negative than the base of current flow through capacitor 430 and resistor 503 into the connection between resistors 502 and 504. Transistor 505 collector current becomes zero and absent a control signal from differential amplifiers 508, 510 would control bistable circuit 521, 522 to return the charger circuit to normal regulation. However, during the walk-in period, the current will normally advance to the value set on potentiometer 515 and the voltage regulator will be retained in the overcharge mode.

In the walk-in circuit, as transistor 505 turns off, transistor 429 turns on and resistors 428, 431 and transistor 429 provide a fast discharge circuit for condenser 430 to permit very fast recovery of the walk-in capability. Diode 432 is a protective diode which limits the reverse base-emitter voltage applied to transistor 505 during reset of the walk-in circuit.

Manual switching into the overcharge mode is provided by resistor 533 (FIG. 5), diode 532, and switch 534. When switch 534 is closed, current flows through the diode 532, resistor 533 and switch to the negative supply voltage. The base of transistor 522 becomes more negative than the emitter resulting in a cutoff state. When transistor 522 cuts off, transistor 554 turns off and the charger switches into the overcharge state. When switch 534 is opened, transistor 554 is on and the charger regulates normally, the voltage level depending on the value of load current.

A low current detector 330 (FIG. 3) is also provided in the charger. In operation if the current drops below a minimum preset value, relay contacts 334A operate a low current indicator for monitoring purposes. Since the charger current is normally quite low and provides only the losses of the battery, the current detector must be accurate down to extremely small value of currents as compared to the full load rating of the charger.

At very small currents, the peak-to-peak voltage across the filter inductor 300 in the power circuit goes to zero. As shown in FIG. 3, a pair of input leads 262 and 263 for the detector 330 are connected across the filter inductor 300. A rectifier 337 and capacitor 339 produce a reference voltage across 339 proportional to the peak voltage which is applied to the base of transistor 331 for comparison with a fixed voltage applied to the base of transistor 332 in the differential amplifier 331, 332. The differential amplifier responsively supplies base current drive for transistor 333 which in turn controls the energization of the relay 334. The relay 334 is normally energized closing its contacts 334A to provide a current indication if the current is above the preset value and is de-energized to operate contacts 34A if the current drops below this value. Diode 343 clamps the collector voltage of transistor 333 when the transistor turns off to thereby prevent damage to the device. The minimum current is adjusted by potentiometer 342. The exemplary voltages +15 and −15 in the illustrated embodiment are with respect to the R bus designated 263.

A low voltage detector may also be provided to sense low battery voltage and provide a relay contact indication. If a low voltage and low current indication occur simultaneously an alarm may be given to indicate that there is a failure in the charger circuit preventing the charger from supplying the load.

In a further embodiment a high voltage detector may be provided to sense the output voltage and to provide an alarm signal and a signal to shut down the charger if high voltage occurs. This voltage level would be adjusted at some value above the high charge voltage.

Figure 1C:
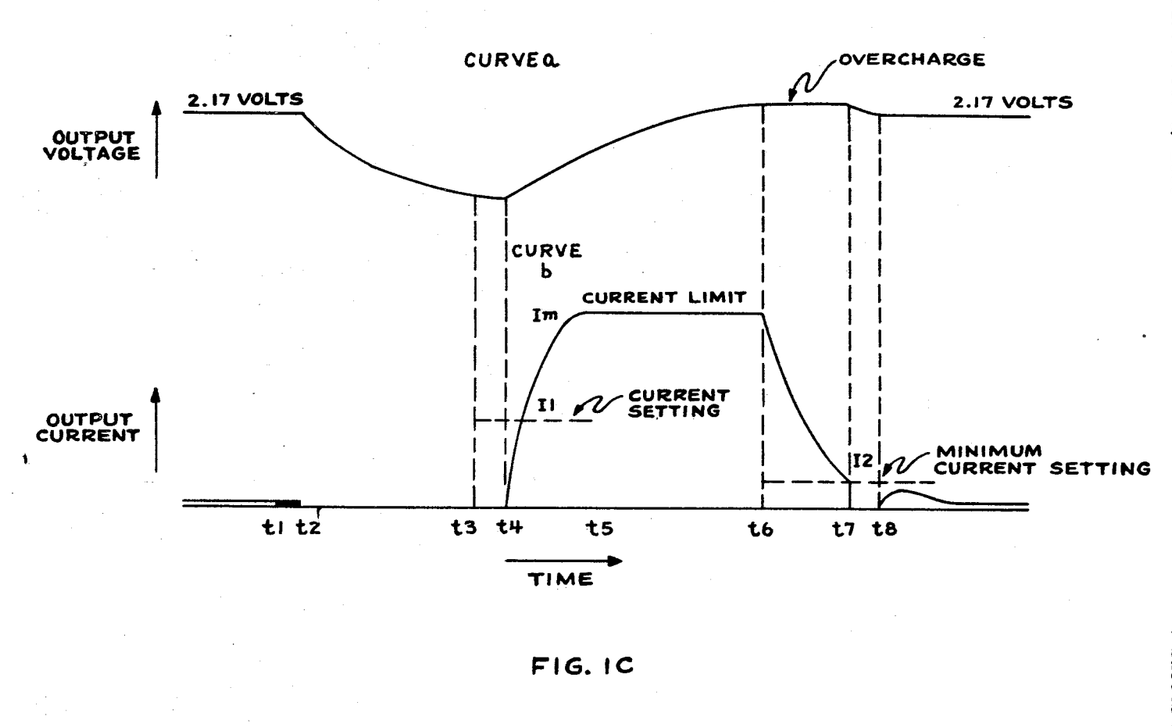
FIG. 1C includes a set of curves *a* and *b* which illustrate the manner of operation of the end cell charger means of the invention.

SEQUENTIAL CIRCUIT DESCRIPTION
(FIG. 1C)

A brief outline of the operation of the system in achieving regulation for different conditions will more clearly illustrate the manner in which the error signal is adjusted to different values for different voltage and current conditions. Such description is set forth with particular reference to the showing of FIG. 1C which progresses from left to right timewise.

Time: Before $t1$. Normal voltage regulation at 2.17 volts per cell

With AC input assumed present at 111X, 111Y (FIG. 2), the output DC voltage at 111A, 111B is regulated at 2.17 v./cell by voltage feedback regulator (FIGS. 4 and 5) and power circuit (FIGS. 2 and 3).

(1) *Current control.*—Current switching and regulating circuit 400A supplied at this time over lead 426A (FIG. 4) to amplifier 460 is maximum resulting in diode 440 assuming a nonconducting state.

(2) *Voltage control.*—Transistor 554 is in a saturated state as a result of input over conductor 520A from switching circuit 559, and resistor 552 is shorted by conducting transistor 554 to reduce the reference potential across resistor 546 and the voltage sensing and control circuit 560 provides regulation at 2.17 volts per cell. That is, the output of the power section at 111A, 111B (and input +B and −B to circuit 560) is controlled such that the potential from +B to base of transistor 554 is equal to the reference potential, thus maintaining the DC output float voltage at the preset value of 2.17 volts. This value can be adjusted by means of variable resistor 547 which changes the reference level for the differential amplifier 543, 544.

In order to illustrate the mode in which voltage regulation is achieved, a minor disturbance which raises the DC output voltage at 111A and 111B a small amount is now assumed (i.e., such as may be caused by load or line voltage change).

(a) The potential of the base of transistor 544 is lowered with respect to the base of transistor 543 which causes transistor 543 collector current to decrease.

(b) the base current of transistor 435 increases and accordingly the collector current of transistor 435 increases.

(c) The base potential of transistor 443 becomes more positive, causing the emitter potential of 443 to become more positive, whereby the signal on error output lead 448 becomes more positive.

(d) A more positive error output signal applied to the pulse generator circuits 207, 208 produces a larger delay angle $\alpha$.

(e) A larger delay angle $\alpha$ forces the SCR's to conduct for a smaller interval of time.

(f) The output voltage decreases to correct for the disturbance.

13

Time: from t1 up to but not including t2

Assuming now that power failure occurs at time t1 and alternating current is removed from 111X, 111Y (FIG. 2) so that the system of FIG. 1A, including end cell charger, is deenergized.

Time: t2

End cell 113, for example, is switched to load at time t2 by control circuit 106 (FIG. 1A).

Time: t2 up to but not including t3

End cell 113 supplies load and discharges as shown.

Time: t3 up to but not including t4

Assuming that at t3 the fault is remedied, and the alternating current reappears at the input 111X, 111Y (FIG. 2), the end cell charger 111 remains off due to cutoff of power at 111X, 111Y by the deenergized end cell switch 109.

Time: t4 up to but not including t5

When end cell switch 109 returns to the float position, and the load 105 is removed from the end cells at time t4, such as 113, contactor 111D connects power over contacts 111E, 111F to the end cell charger 111. The end cell charger 111 is forced into a current regulating mode due to the low output voltage on output conductor 111A, 111B. The walk-in circuit (FIGS. 4 and 5) controls the current to pick up slowly (FIG. 1C) as described earlier.

Voltage at the base of transistor 425 which is proportional to the load current is compared with the current reference voltage across resistor 501. Assuming that a disturbance forces the load current to increase a small amount, the base of transistor 425 becomes more negative than the base of transistor 426.

Transistor 426 collector current decreases, causing the voltage across resistor 422 to decrease. When voltage across resistor 422 is smaller than the voltage across resistor 438, diode 440 conducts current, causing the base current of transistor 435 to increase. The same sequence as described for voltage regulation occurs to control the output voltage of the charger to decrease and thereby cause the load current to decrease to correct for the disturbance.

As noted above, absent such disturbance, the current reference voltage across resistor 501 increases from zero to a maximum value at a rate determined by capacitor 430 in the walk-in circuit. This causes the output current to increase gradually in the same manner as the current reference voltage. As further noted above, during such walk-in period, transistor 521 conducts, and the voltage circuit 560 is placed in the overcharge mode. With normal regulation, however (i.e., the battery only partially discharged) when the current increases above the current setting $I_1$ (FIG. 1C) which value is determined by the adjustment on potentiometer 515, the collector current of transistor 508 increases and the collector current of transistor 510 decreases. The base current of transistor 521 increases forcing transistor 521 to conduct and transistor 522 to be nonconducting. The base potential of transistor 554 becomes more positive resulting in transistor 554 turning off, whereby the voltage reference is increased, forcing the voltage regulating circuit to regulate in the overcharge mode (2.33 volts).

Time: t5 up to but not including t6

At t5 the current reaches the maximum current limit $I_m$, which value is determined by the adjustment on variable resistor 418. The charger remains in a constant current mode of operation (maximum current $I_m$) during the time the battery voltage is low (below overcharge voltage setting).

14

Time: t6 up to but not including t7

At point t6 the voltage at terminals 111A, 111B reaches 2.33 volts and the circuit reverts to a voltage regulating mode, holding the output voltage constant. The current decreases at a constant battery voltage. When the current drops below $I_1$ the differential amplifier 508, 510 removes the input signal to the base of transistor 521. The voltage regulator remains in the overcharge state, however, due to the bistable properties of the flip-flop comprising transistors 521 and 522.

Time: t7 up to but not including t8

When the load current drops below $I_2$ the base of transistor 512 becomes more positive than the base of transistor 513 and the collector current of transistor 513 increases. The base current of transistor 522 increases, forcing transistor 522 into a conducting state. This reverses the state of the transistor 521 and 522, forcing transistor 554 into saturation and the circuit reverts back to the normal float charge mode of operation (e.g., 2.17 volts/cell). The load current drops to zero for a short interval until the battery voltage has dropped to the float voltage setting. This drop in current to 0 (between t7 and t8) is caused by a decrease in the voltage reference produced by transistor 554 going into saturation, forcing the amplifier 460 to turn SCR's off until the battery has discharged (due to internal battery losses) to the float level.

Time: t8 forward

When the battery has discharged to the float level, the circuit voltage regulates at the float level as described in the initial example.

While what is described is regarded to be a preferred embodiment of the invention, it will be apparent that variations, rearrangements, modifications and changes may be made therein without departing from the scope of the present invention as defined by the appended claims.

What is claimed is:

1. In an automatic telephone system, a main battery, a main charger for said battery, end cells for said battery, means for connecting at least one of said end cells in series with said main battery for operation at least during failure of the source voltage, separate battery charger means independent of said main charger for charging said end cells from said source, and control means for automatically effecting recharging of said end cells by said separate battery charger means in response to sensed charging current and voltage conditions.

2. A system as set forth in claim 1 in which said separate battery charger means includes a source of alternating current power, a controlled rectifier circuit, and power transformer means connected to supply power from said rectifier circuit to said end cells, and in which said control means vary the period of conduction of power by said rectifier circuit from said source to said power transformer in each cycle.

3. A system as set forth in claim 1 in which said control means includes at least one input circuit for providing current signals to effect current overload protection, and a second input circuit for providing voltage signals to effect load voltage regulation.

4. In an automatic battery charger for a load, voltage regulator means connected to said load to sense the voltage of the load including means for providing an error signal to maintain the voltage of said load at a first predetermined level, current sensor means connected to sense the current level of said load current, current regulator means controlled by said current sensor means to change the value of said error signal with sensing of given current conditions including current limit means for limiting the load current to a predetermined value by adjustment of said error signal, switching means controlled by said current sensor means including a first means operative to adjust the regulation by said voltage regulator means to a second level responsive to sensing of a current value of a first preset value by said current sensor means, a second means operative to adjust the regulation by said voltage regulator means back to said first level responsive to drop of said load current thereafter to a preset value different than said first preset value, and power supply means controlled to adjust the power supplied to the load as determined by said error signal.

5. An automatic battery charger as set forth in claim 4 in which said switch means includes further means for controlling said current limit means to limit the rate of current change to said load immediately after connection of the charger to the power source.

6. In an automatic battery charger as set forth in claim 4 in which said switching means includes switch means controlled by said first and second means to adjust said regulation between said first and second level, and walk-in means for controlling said current limit means to limit the rate of load current change immediately after connection of the charger to the power source, and for controlling said switch means to adjust regulation to said second level independent of any operation of said switch means by said first and said second means.

7. In an automatic battery charger for a load, voltage regulator means connected to said load to sense the voltage of the load including means for providing an error signal to maintain the voltage of said load at a first predetermined level, current sensor means connected to said load to sense the load current, control means connected to said current sensor means for adjusting the value of said error signal with sensing of different current conditions including a first means for adjusting said error signal to limit said load current to a predetermined maximum value, a second means for establishing a rate of change for said error signal when the charger is connected to a power source, and a third means for controlling said voltage regulator means to regulate the voltage at an increased level whenever the greater of two preset values of load current is sensed, and power supply means controlled to adjust the power supplied to said load as determined by said error signal provided by said voltage regulator means and said current sensor means.

8. In an automatic battery charger for a load, voltage regulator means connected to said load to sense the voltage of the load including means for providing an error signal to maintain the voltage of said load at a first predetermined level, current sensor means connected to said load to sense the load current, control means connected to said current sensor means for adjusting the value of said error signal with sensing of different current conditions including switching means for controlling said voltage regulator means to shift from regulation at said first level to regulation at said second level, and means connected to said current sensor means for adjusting the rate of change of said error signal after connection of the charger to a power source, and to also effect operation of said switching means, and power supply means controlled to adjust the power supplied to said load as determined by said error signal provided by said voltage regulator means and said current sensor means.

9. In an automatic battery charger for a load, voltage regulator means connected to said load to selectively regulate the voltage of the load at a first and a second voltage of different values including means for providing an error signal to maintain the voltage of said load at the selected one of said values, current sensor means connected to said load to sense the load level of said current, level selection means in said voltage regulator means for adjusting the level of regulation to different values, switching means including a first means for controlling said level selection means to effect regulation at said first voltage value responsive to detection of a first preset current of a lesser value, and a second means for controlling said level selection means to adjust said voltage regulator means to regulate at said second voltage value in response to detection of a second larger preset value of current.

10. An automatic battery charger as set forth in claim 9 in which said first predetermined voltage value is a float charge voltage and said second voltage value is an overcharge voltage, and which includes means for presetting the values of each level at which said voltage regulator means regulates.

References Cited
UNITED STATES PATENTS

| | | | |
|---|---|---|---|
| 1,931,867 | 10/1933 | Holden et al. | 307—66 |
| 1,970,939 | 8/1934 | Langabeer et al. | 307—66 |
| 3,305,725 | 2/1967 | Huge et al. | 320—22 X |
| 3,310,729 | 3/1967 | Burgess et al. | 323—22 X |
| 3,356,891 | 12/1967 | Godard | 307—66 X |
| 3,376,487 | 4/1968 | Bixby | 320—32 |
| 3,412,308 | 11/1968 | Brown | 320—24 |

LEE T. HIX, Primary Examiner

J. M. GUNTHER, Assistant Examiner

U.S. Cl. X.R.

320—23, 32; 323—20